United States Patent [19]

Sasaki et al.

[11] Patent Number: 5,388,617

[45] Date of Patent: Feb. 14, 1995

[54] PIPE REPAIR METHOD USING A SHAPE-MEMORY ALLOY AND PIPE REPAIR MEMBER

[75] Inventors: Toru Sasaki; Toru Nagao, both of Utsunomiya, Japan

[73] Assignee: Fuji Jukogyo Kabushiki Kaisha, Tokyo, Japan

[21] Appl. No.: 152,101

[22] Filed: Nov. 15, 1993

Related U.S. Application Data

[63] Continuation of Ser. No. 813,641, Dec. 27, 1991, abandoned.

[30] Foreign Application Priority Data

Mar. 1, 1991 [JP] Japan .................. 3-059580

[51] Int. Cl.6 .............................................. F16L 55/16
[52] U.S. Cl. ........................................ 138/99; 138/166
[58] Field of Search ................... 138/97, 98, 99, 151, 138/158, 161, 162, 166, 167, 168, 148; 24/16 PB

[56] References Cited

U.S. PATENT DOCUMENTS

| | | | |
|---|---|---|---|
| 724,420 | 4/1903 | Angell | 138/158 |
| 3,744,096 | 7/1973 | Kok | 24/16 PB |
| 4,268,329 | 5/1981 | Jervis | 138/99 |
| 4,435,460 | 3/1984 | Menzel | 138/148 |
| 4,639,016 | 1/1987 | Rogers et al. | 138/97 |
| 4,705,078 | 11/1987 | Montgomery | 138/99 |
| 4,713,272 | 12/1987 | Bachel et al. | 138/169 |
| 4,723,578 | 2/1988 | Mordarski et al. | 138/89 |
| 4,793,382 | 12/1988 | Szalvay | 138/97 |
| 4,838,318 | 6/1989 | Karakawa | 138/166 |
| 5,002,094 | 3/1991 | Brovont | 138/99 |
| 5,054,513 | 10/1991 | Trueb et al. | 138/158 |
| 5,086,809 | 2/1992 | Bridges | 138/98 |
| 5,247,967 | 9/1993 | Bourque | 138/99 |

FOREIGN PATENT DOCUMENTS

| | | |
|---|---|---|
| 63-195198 | 12/1988 | Japan . |
| 2-168005 | 6/1990 | Japan . |
| 2145150 | 3/1985 | United Kingdom ............ 24/16 PB |

Primary Examiner—David A. Scherbel
Assistant Examiner—James F. Hook
Attorney, Agent, or Firm—Beveridge, DeGrandi, Weilacher & Young

[57] ABSTRACT

The present invention relates to a pipe repair method using a shape-memory alloy that can correspond to pipes of any shape and dimension. The pipe repair method comprises the steps of applying a seal member to a damaged portion of the pipe so as to cover the damaged portion and winding a plate made from a shape-memory alloy that contracts to a memorized shape around a periphery of the pipe so as to cover the seal portion when heated.

27 Claims, 4 Drawing Sheets

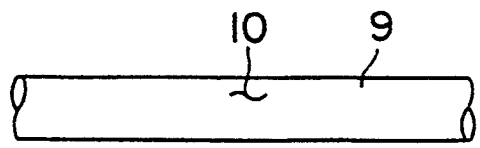
FIG. IA
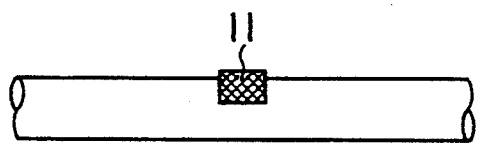
FIG. IB
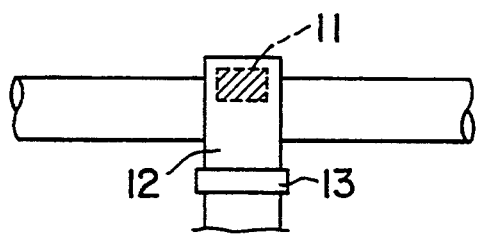
FIG. IC
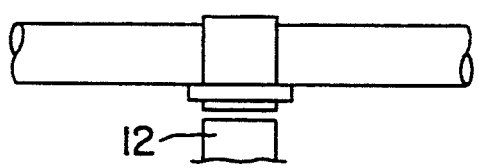
FIG. ID
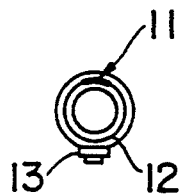
FIG. IF
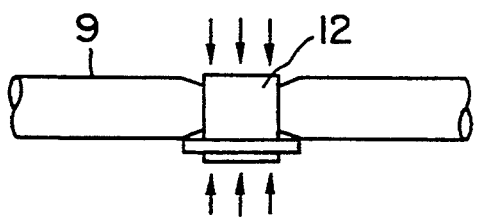
FIG. IE

5,388,617

PIPE REPAIR METHOD USING A SHAPE-MEMORY ALLOY AND PIPE REPAIR MEMBER

This application is a continuation of application Ser. No. 07/813,641, filed Dec. 27, 1991, which application is entirely incorporated herein by reference, now abandoned.

BACKGROUND OF THE INVENTION

The present invention relates to a pipe repair method using a shape-memory alloy when repairs are made to the pipes of aircraft and the like, and to a pipe repair member using this method.

In general, when damage has occurred to pipes, the pipe having the damaged portion is replaced or the damaged portion of the pipe is cut out and a new pipe is connected to the remaining portion. However, when many pipes are closely packed as in the case of aircraft and the like, it is extremely difficult to exchange and reconnect the pipes. In addition, when the pipes are exchanged, it is necessary to make exactly the same shape as the old pipe. And when connectors are used, it is necessary to use special processing to the end portions of the pipe.

In order to overcome such a situation as above, various pipe repair techniques have been proposed as shown in FIG. 9. Japanese Patent Application Laid-Open Number 195198/1988 discloses a method where a pipe repair member includes a pair of two semi-cylindrical portions made from a shape-memory alloy. An edge portion along one of the semi-cylindrical portions 1 has a catch portion 2, and the edge portion along the other of the semi-cylindrical portions 3 has a groove portion 4.

In addition, as shown in FIG. 10, Japanese Patent Application Laid-Open Number 168005/1990 discloses a method for punching process to stoppers 6,7 at each end of a band-shaped plate 5 made from the shape-memory alloy.

However, according to Japanese Patent Application Laid-Open Number 195198/1988, a straight portion of the pipe can be effectively repaired but there is the problem that a curved portion can not be repaired. In addition, with either the invention or the prior art described above, many types of repair parts have to be prepared for each type of the pipes having various dimensions. Thus, it is very difficult to have many repair members corresponding to respective shapes and dimensions.

SUMMARY OF THE INVENTION

The object of the present invention is to provide a pipe repair method using a shape-memory alloy and a pipe repair member that can correspond to pipes with any shapes and dimensions.

In order to achieve the object described above, the pipe repair method using a shape-memory alloy according to the present invention comprises the steps of covering a seal member to a damaged portion of a pipe, winding a thin band-shaped plate made from a shape-memory alloy, contracting to a memorized shape around a periphery of the pipe so as to cover the seal member when heated, clamping both ends of the thin band-shaped plate with a clamp, and heating the thin band-shaped plate to a temperature above a shape transformation temperature.

In addition, the pipe repair member according to the present invention comprises a seal member that covers a damaged portion of a pipe or the periphery of the pipe, a thin band-shaped plate made from a shape-memory alloy and being wound around an outer periphery of the pipe so as to cover the seal member, and a clamp for clamping both ends of the this band-shaped plate.

By the adoption of the method described above, when the thin band-shaped plate is heated to above the transformation temperature, the thin band-shaped plate contracts to a shape to closely contact with the outer periphery of the pipe. As a result, the outer periphery closely contacts with the thin band-shaped plate so as to seal the damaged portion.

Here, when the thin band-shaped plate is wound around the pipe and fixed to closely contact with the outer peripheral surface of the pipe, and when the sealing member closely contacts with both the outer peripheral surface of the pipe and the thin band-shaped plate, it is possible to correspond to any shapes or dimensions.

BRIEF DESCRIPTION OF DRAWINGS

FIGS. 1A to 1F are sequential views of a portion of a pipe to be repaired according to a first embodiment of the present invention;

DETAILED DESCRIPTION OF THE PREFERRED EMBODIMENTS

A preferred embodiment of the present invention will become understood from the following detailed description referring to the accompanying drawings.

In FIG. 1 describing a first embodiment of the present invention, FIG. 1A shows a damaged portion 10 such as a crack in the pipe 9 that has to be repaired. Then, as shown in FIG. 1B, a sealing member 11 covers the damaged portion 10 for repair. The sealing member 11 can desirably be a chosen from an elastomer (a polysulfide rubber) or thermo-hardening epoxy resin that can be fluidified by heating, and selected in accordance with the fluid that flows inside the pipe.

Figure 2:
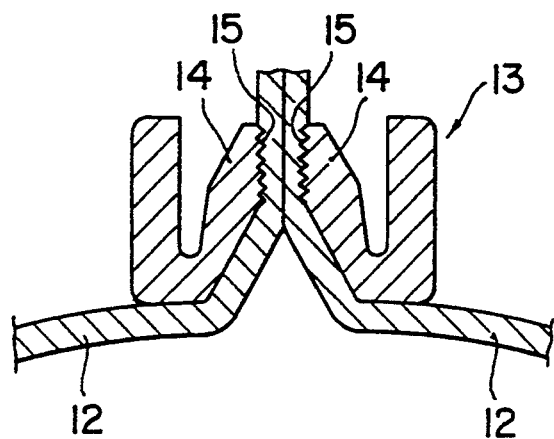
FIG. 2 is a sectional view showing one example of a clamp fitting.

After this, as shown in FIG. 1C, a thin band-shaped plate 12 made from a shape-memory alloy that contracts to a memorized shape when heated is wound around the outer periphery of the pipe 9 so as to cover the sealing member 11. Moreover, as shown in FIG. 2, a clamp 13 of the thin band-shaped plate 12 has teeth 15 on opposing surfaces of a clamping portion 14, and the teeth 15 overlap both end portions of the thin band-shaped plate 12 and sandwich the pipe 9. As shown in FIG. 1C and FIG. 2, the end portions of the thin plate pass through a through-hole in the clamp 13 which is defined by the opposing surfaces 15 of clamping portions 14. So as to ensure tight clamping of the thin band-shaped plate 12, the thin band-shaped plate 12 desirably has knurling on the surfaces that oppose the clamp 13, so that the teeth 15 bite into the thin band-shaped plate 12 more easily.

Once both end portions of the thin band-shaped plate 12 are clamped by the clamp 13, then as shown in FIG. 1D, the unnecessary portions of the thin band-shaped plate 12 are cut off in the vicinity of the clamp 13. After cutting, as shown by the arrow in FIG. 1E, a heater is used to heat the thin band-shaped plate 12 that has been wound around the outer periphery of the pipe 9 so as to cover the sealing member 11 to above the transformation temperature. FIG. 1F shows a front view of the portion of the pipe 9 to be repaired shown in FIG. 1D.

When heating is done, the thin band-shaped plate 12 contracts to return to its original stored shape, and the sealing member 11 also contacts with the outer periphery of the pipe 9. At this time, the sealing member 11 is fluidified by the heat and flows to fill between the thin band-shaped plate 12 and the outer periphery of the pipe 9 and the damaged portion 10. The thin band-shaped plate 12 therefore closely and definitely contacts with the outer periphery of the pipe 9 and the damaged portion 10 of the pipe 9 is sealed. Moreover, when the damaged portion 10 is a crack or the like, any further development of the opening is prohibited by tightening of the thin band-shaped plate 12 around the outer periphery of the pipe 9.

Here, the band-shaped thin plate member 12 can change to any shape and so it can be wound around a pipe of any shape or dimension.

Figure 3A:
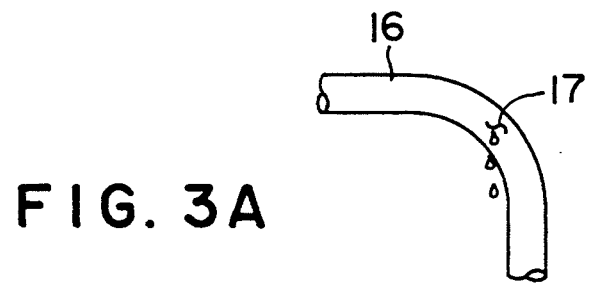
FIGS. 3A to 3C are sequential views of a portion of a pipe to be repaired according to a second embodiment of the present invention.
Figure 3B:
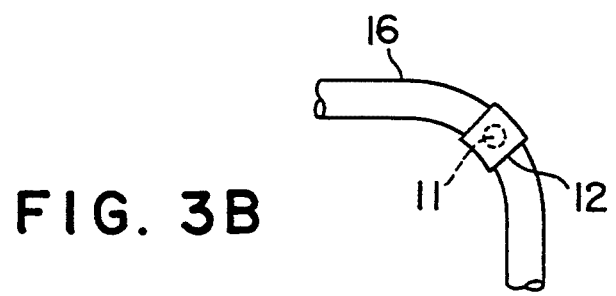
Figure 3C:
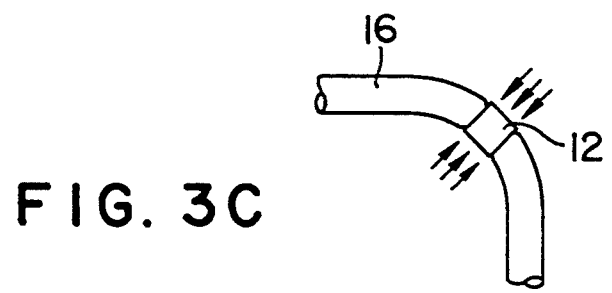

The following description is a second embodiment of the present invention. As shown in FIG. 3A for the case when there is a damaged portion 17 in a curved portion of a pipe 16, a sealing member 11 covers the damaged portion 17 and its periphery as shown in FIG. 3B, and a thin band-shaped plate 12 is wound around the outer periphery of the pipe 16 so as to cover the sealing member 11. Then, after the clamp (not shown) has engaged both ends of the thin band-shaped plate 12, the plate is heated to above its transformation temperature as shown by the arrow in FIG. 3C, and the damaged portion 17 in a curved portion of the pipe 16 is sealed and repaired.

In addition, the present invention can also be applied to the connection of the pipes and not just for the repair.

Figure 4A:
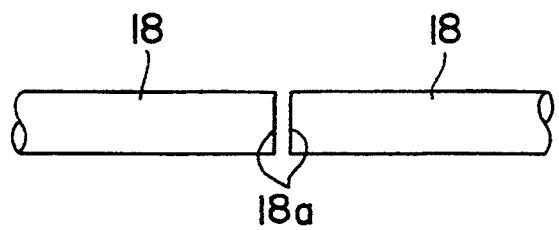
FIGS. 4A to 4D are sequential views of a portion of a pipe to be repaired according to a third embodiment of the present invention.
Figure 4B:
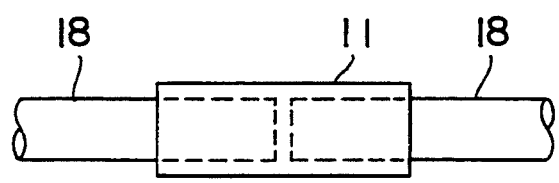
Figure 4C:
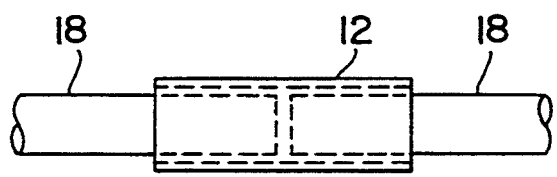
Figure 4D:
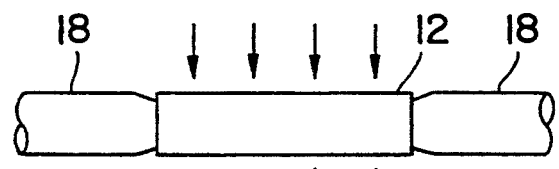

With respect to the connection, the following description is a third embodiment of the present invention. When the connecting portions of pipes 18, 18 are connected as shown in FIG. 4A and FIG. 4B, connection portions 18a are covered with the sealing member 11. Then, as shown in FIG. 4C, the thin band-shaped plate 12 is wound around the connecting portion so as to cover the sealing member 11 and both of the ends are clamped by the clamp (not shown). Then, as shown by the arrow in FIG. 4D, the thin band-shaped plate 12 is heated to above its transformation temperature and tightened around the connecting portions of the pipes 18, 18 so as to connect the pipes 18, 18.

In this manner, the present invention can be applied to the pipes with any shapes or dimensions since the thin band-shaped plate 12 covers the damaged portion of the pipe, and can change its shape freely and can have its length adjusted by cutting.

Figure 5:
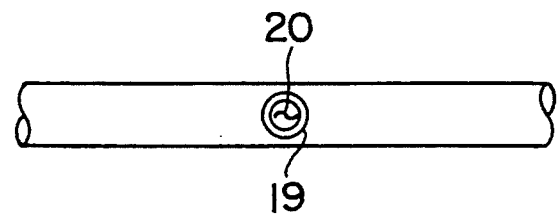
FIG. 5 is a view showing another example of a sealing member.

In addition, the present invention is not limited to the embodiments that have been described above. An O-ring 19 or the like shown in FIG. 5 can be used as the sealing member, and the O-ring 19 covers the periphery of a damaged portion 20.

Also, the thin band-shaped plate can be suitably chosen to have a large or small width in accordance with usage, and can be wound two or three times.

Figure 6:
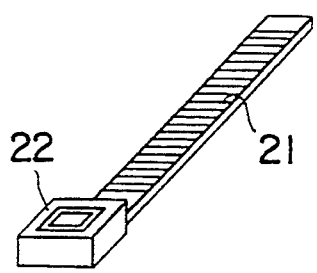
FIG. 6 is a perspective view showing one example of a band clamp according to the present invention.
Figure 7:
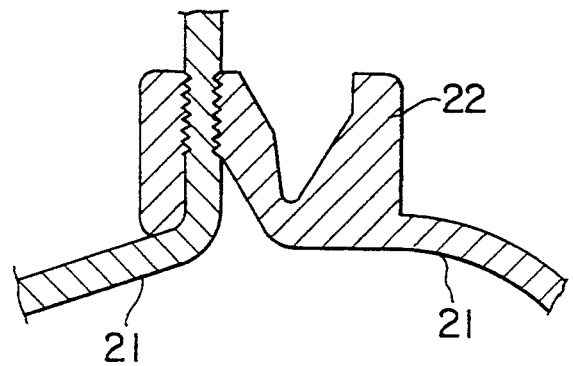
FIG. 7 is a partial sectional view showing the band clamp shown in FIG. 6.

Furthermore, as shown in FIG. 6 and FIG. 7, a thin band-shaped plate 21 and a clamp 22 can be a single unit.

Figure 8:
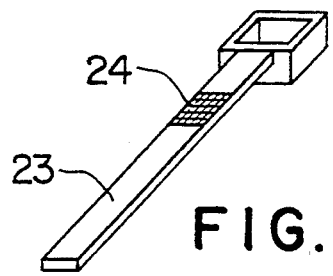
FIG. 8 is a perspective view showing another example of the band clamp according to the present invention.
Figure 9:
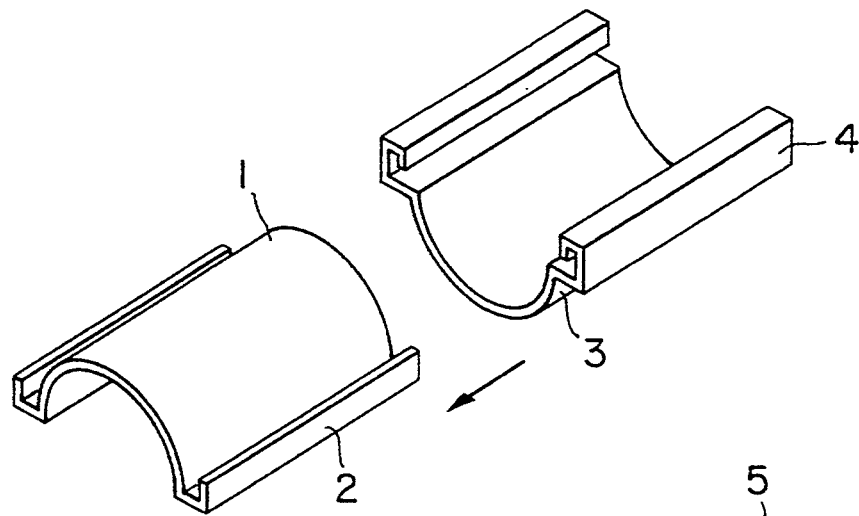
FIG. 9 is a perspective view showing an example of a portion repaired by a conventional method.
Figure 10:
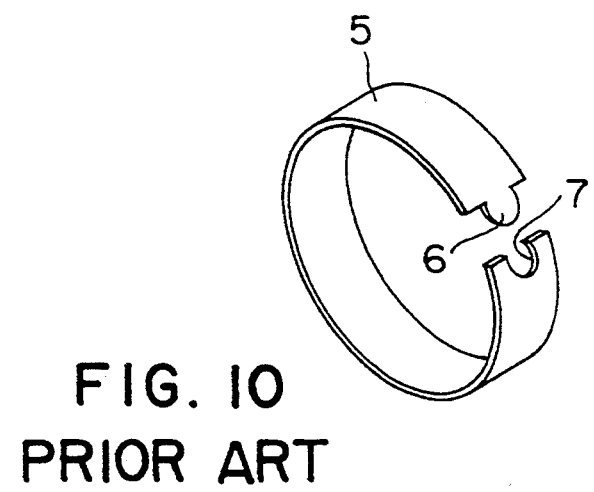
FIG. 10 is a perspective view showing another example of a portion repaired by a conventional method.

Also, as shown in FIG. 8, a thin band-shaped plate 23 and a sealing member 24 can be used as a single unit.

According to the present invention, the heating of the thin band-shaped plate to above the transformation temperature causes to contract and closely to contact with an outer periphery of the pipe, so that the sealing member closely contacts with the thin band-shaped plate, the outer peripheral surface of the pipe and the damaged portion of the pipe. Therefore, the damaged portion of the pipe is sealed.

Here, the thin band-shaped plate is wound and fixed around the pipe and closely contacts with the outer peripheral surface of the pipe and the sealing member fills between the outer peripheral surface of the pipe and the thin band-shaped plate. And the thin band-shaped plate can fit any shapes or dimensions of the pipes.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A method for repairing a pipe for fluid transport using a shape-memory alloy, comprising the steps of:
   specifying a cracked or damaged portion to be repaired in said pipe;
   selecting a fluidifiable seal member having a material compatible with the fluid transported in said pipe;
   applying said seal member over the damaged portion of said pipe so as to cover the damaged portion;
   winding a band-shaped plate made from an elongated length of shape-memory alloy about an outer periphery of a section of said pipe so as to cover said seal member, said band-shaped plate having a first end and a second end;
   positioning a clamp with a hole adjacent to said pipe;
   passing said first end of said band-shaped plate through said hole, and thereafter clamping said band-shaped plate member with said clamp while keeping said band-shaped plate tensioned so as to retain the first and second ends in a fixed position with respect to the pipe; and
   heating said band-shaped plate to a temperature for achieving transformation of said shape-memory alloy plate to a previously memorized shape, and heating said seal member such that said seal member becomes fluidized and flows to fill the damaged portion.

2. A pipe repair method as recited in claim 1 further comprising fluidifying said seal member during the heating of said plate.

3. A pipe repair method as recited in claim 1, wherein the clamping of the plate includes passing the first end of said plate through said clamp with the second end of said plate being integral with said clamp such that said clamp and plate form a single unit.

4. A pipe repair method as recited in claim 3, further comprising fluidifying said sealing member during the heating of said plate end said clamping includes forcing a flexible toothed member into contact with said plate.

5. A pipe repair method as recited in claim 1 wherein said step of applying a seal member includes positioning a patch containing an elastomer material on the damaged portion.

6. A pipe repair method as recited in claim 1 wherein said step of applying a seal member includes positioning a patch containing a thermo hardened epoxy resin on the damaged portion.

7. A pipe repair method as recited in claim 1, wherein applying the seal member includes applying the seal member about the periphery of said pipe.

8. A pipe repair method as recited in claim 1, wherein winding said plate includes winding said plate around a lengthwise bend in the pipe.

9. A pipe repair method as recited in claim 1, wherein said plate is curved in width subsequent to heating so as to conform with a bend in the pipe.

10. A pipe repair method as recited in claim 1, further comprising passing the second end of said plate through said through-hole such that both the first and second ends of said plate are clamped between opposing toothed surfaces of said clamp, and cutting said first and second ends adjacent said clamp.

11. A pipe repair method as recited in claim 1, further comprising passing the second end of said plate through said through-hole and manipulating said clamp so that the plate is tightly wrapped about the pipe and the first and second ends of said plate extend out away from the pipe and heating is conducted subsequent to manipulating said clamp and heating said plate includes heating said plate to a temperature above a temperature for shape transformation.

12. A method as recited in claim 1 further comprising cutting off a portion of said plate extending away from said clamp member in an area adjacent said clamp.

13. A method as recited in claim 12 wherein cutting the portion of said plate occurs prior to heating said plate.

14. A pipe repair method as recited in claim 1 wherein said band-shaped plate member has, when in a preheated state, two planar major surfaces, and said plate being equally applicable and conformable in fluid tight fashion to both a lengthwise bend or a straight pipe section upon one of said planar major surfaces being applied to either a curved or a straight pipe section and upon said plate being heated to a transformation temperature.

15. A pipe repair method as recited in claim 1 wherein winding includes wrapping said band-shaped plate about the periphery of said pipe more than one time.

16. A pipe repair member for repairing a pipe carrying fluid, comprising:
 a seal member for covering a cracked or damaged portion of said pipe;
 a band-shaped plate member made from an elongated length of shape-memory alloy and being wound around an outer periphery of said pipe so as to cover said seal member, said band-shaped plate member having a first end and a second end; and
 a clamp for clamping both ends of said band-shaped plate member, said clamp including a through-hole formed therein and said clamp being dimensioned and arranged so as to clamp said first end of said band-shaped plate member when the first end of the band-shaped plate member is threaded through said through-hole, and said clamp member and band-shaped plate member being dimensioned and arranged with respect to the pipe and the cracked or damaged portion such that, upon heating said band-shaped plate member to a transformation temperature, said band-shaped plate member returns to a previously memorized state so as to repair said cracked or damaged portion in a fluid tight manner.

17. The pipe repair member according to claim 16, wherein said seal member comprises an O-ring positioned so as to peripherally cover the damaged portion.

18. The pipe repair member according to claim 16, wherein the second end of said plate is integrally formed with said clamp.

19. The pipe repair member according to claim 16, wherein said seal member is integrally formed in said band-shaped plate member.

20. The pipe repair member according to claim 16, wherein said seal member comprises a patch having an elastomer material which is fluidified upon being heated, and said patch having a length less than that of said elongated band-shaped plate member and said patch having end edges positioned closer to one end of said band-shaped plate member than an opposite end of said band-shaped plate member.

21. The pipe repair member according to claim 16 wherein said seal member is a patch which includes a thermo-hardening epoxy resin which is fluidified upon being heated.

22. The pipe repair member according to claim 16, wherein said clamp includes two opposing surfaces with each of said surfaces including teeth.

23. The pipe repair member according to claim 22, wherein said plate includes a knurled section which is adapted to receive the teeth of said clamp.

24. A pipe repair member as recited in claim 16 wherein said plate has a constant width from the first end of the plate to the second end of the plate.

25. A pipe repair member as recited in claim 16 wherein said band-shaped plate member has, when in a preheated state, two planar major surfaces, and said plate, after being heated to a transformation temperature, is equally applicable and conformable in fluid tight fashion both to a lengthwise bend or a straight pipe section upon being applied to either a lengthwise bend or straight pipe section.

26. A pipe repair member as recited in claim 16 wherein said band-shaped plate has multiple wrappings about the periphery of said pipe.

27. A pipe repair apparatus, comprising,
 an elongated band-shaped plate formed of shape-memory alloy, said elongated band-shaped plate having a first end and a second end and two major surfaces which are planar when in a preheated state, the shape-memory alloy having a memorized shape which, upon application of the band-shaped plate to the pipe and upon heating of said band-shaped shaped plate, is conformable to both a curved or a straight pipe section so as to conform in a fluid tight manner to a particular shape and size of the pipe which is being repaired;
 a clamp for fixing in position said first and second ends of said plate, said clamp including a through-hole through which said first end of said plate is adapted to pass, and said clamp being dimensioned and arranged so as to fix said ends of said plate into a fixed position both prior to and subsequent to a heating of said shape-memory alloy plate and a transformation of said plate to a memorized state, and said clamp having a toothed section for facilitating the fixture of said first and second ends in position; and a seal member which is in a solid state when in a first state and is adapted to become more fluid upon said plate member being heated such that said fluidized seal member fills in a cracked or damaged portion of the pipe and forms a seal between said plate and the pipe when said plate is positioned about the pipe and contracts to the memorized shape.

* * * * *